United States Patent [19]

Chenoweth et al.

[11] 3,928,822

[45] Dec. 23, 1975

[54] THERMAL DIFFERENTIAL COMPENSATOR

[75] Inventors: Amos J. Chenoweth, Florissant, Mo.; William E. Heafner, Godfrey, Ill.

[73] Assignee: The United States of America as represented by the Secretary of the Air Force, Washington, D.C.

[22] Filed: July 9, 1974

[21] Appl. No.: 486,803

[52] U.S. Cl. .......................... 332/7.51; 350/160 R
[51] Int. Cl.² ........................................ H01S 3/10
[58] Field of Search ............... 332/7.51; 350/160 R; 250/199

[56] References Cited
UNITED STATES PATENTS 3,875,400  4/1975  Pao ............................... 332/7.51 X Primary Examiner—Richard A. Farley
Attorney, Agent, or Firm—Joseph E. Rusz; Robert Kern Duncan

[57] ABSTRACT

Lithium tantalate modulation crystals inside a boron nitride oven core are optically compensated by providing a temperature differential between the crystals. This is done by controlling the heater current flowing through the heaters on the core.

2 Claims, 5 Drawing Figures

THERMAL DIFFERENTIAL COMPENSATOR

RIGHTS OF THE GOVERNMENT

The invention described herein may be manufactured and used by or for the Government of the United States for all governmental purposes without the payment of any royalty.

BACKGROUND OF THE INVENTION

The field of the invention is in the art of laser beam modulation.

In a laser modulator it is necessary to establish an initial optical operating point (ideally a zero field condition) so that the modulation can be performed about that point. Establishing this desired operating point is commonly known as optical compensation. Previously, this optical compensation has been achieved by placing a manual optical compensator (such as the Babinet-Soleil type) in the laser light beam external to the modulator crystals, or by the application of a voltage to the modulator crystals themselves to provide "electronic compensation" through the electro-optic effect of the modulator material. Because many modulator materials exhibit voltage induced optical damage, the electronic compensation technique has a limited range of application.

SUMMARY OF THE INVENTION

A thermal differential compensation system utilizing the temperature dependence of modulator crystal birefringence to provide optical compensation of the modulator crystals is disclosed. The system does not require any additional optical components to be placed in the optical path, thus it provides for design simplicity, easier maintainability, and higher optical transmission. The system may be used in conjunction with either conventional automatic or manual electronic compensating to bias the modulator crystals to the desired optical operating point.

BRIEF DESCRIPTION OF THE DRAWING

FIG. 3 is a block diagram showing the cooperation of an embodiment of the invention in a representative complete laser modulation system;

DESCRIPTION OF THE PREFERRED EMBODIMENT

Figure 1:
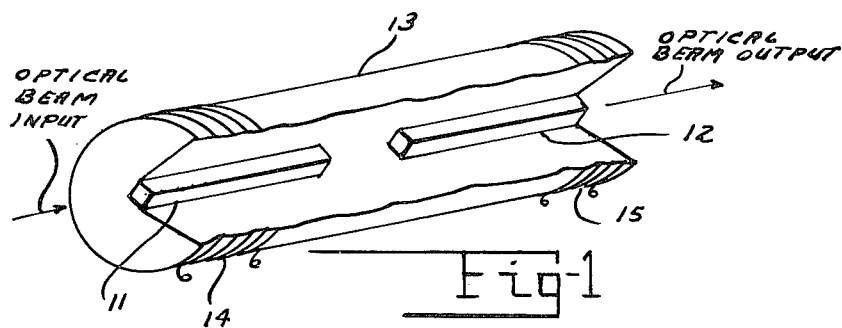
FIG. 1 is a simplified pictorial view of a typical dual crystal laser modulator.

FIG. 1 shows a cutaway view of a typical conventional laser modulator. Both modulator crystals 11 and 12 are contained in an oven core 13. Lithium tantalate is an example of typical modulator crystal material and boron nitride is a typical oven core material. In the prior art optical modulators it is common practice to maintain the crystals at a uniform and equal temperature by two balanced heater coils 14 and 15. The two modulator crystals are oriented such that the optic axis of one crystal is at right angles with respect to that of the other crystal. With this orientation both natural crystal birefringence and thermal induced birefringence effects in the crystals cancel when the two crystals are maintained at the same temperature.

As is well known, when modulating the crystals, it is necessary to maintain the desired initial optical operating point about which modulation takes place. Since the operating characteristics of the crystals may shift with the applied modulation signal, variations in other operating parameters, and in their physical characteristics during fabrication in the modulator assembly, it is common practice to employ some form of electronic compensation to the crystals to adjust their characteristics such that they operate about the desired "initial" optical operating point.

A conventional automatic and manual compensator is shown in FIG. 3. A signal is obtained from the beam splitter 31 and by the conventional functioning of the driver/gate circuit, error amplifier, dither oscillator/detector, and an integrating amplifier contained in modules A and B, direct current field bias is applied through the matching network 32 and broadband loading network 33 to the crystals to compensate for thermal effects not compensated by the crossed axis of the crystals and to compensate for any dc bias level applied by the driver amplifier. A manual compensator 34 is used to provide dc bias for the modulator when automatic operation is not desired. A compensator select switch located on the manual compensator module is used to select the desired mode of compensation, and a coarse or fine manual bias adjustment is conventionally located on the end of the manual compensator module 34. The foregoing is all prior art and as previously stated the required bias applied to the crystals to effect the optical compensation is frequently of such a value that field induced optical damage results in the electrooptic crystal material. This produces a degradation in the extinction ratio and shifts in the optical bias point. The effect-compensation action tends to become regenerative producing erratic automatic compensation and very degraded performance of the system.

The addition of this invention, the thermal differential compensator, shown at 35 in FIG. 3, to the prior art modulation system provides a new mode of modulator control and greatly improves the reliability and operation of the modulation system. The necessary operating ranges of both the manual electronic compensator 34 and the automatic electronic compensator 36 are greatly reduced in magnitude. This reduced range effectively limits the dc fields applied to the crystals so that a high extinction ratio can be maintained while still providing satisfactory compensation range. The crystals now operate with substantially zero average dc field and about a substantially maximum extinction ratio, the ideal operating point. Without this invention, under normal circumstances, the applied driver voltage and natural birefringence caused the automatic compensator to provide an operating point other than the zero field condition. As previously mentioned one means of providing a system that does not require so great a bias on the crystals to achieve the desired operating point is by placing an optical compensator in the laser light beam external to the modulator crystal. This greatly complicates the optic system and incurs considerable additional losses.

In this invention a novel means of compensation was discovered which utilizes thermo-physical-optical characteristics of the modulator crystals themselves without any additional optical components, and without the application of bias voltages to the crystals. This novel technique utilizes the temperature dependence of the modulator crystal birefringence in order to produce optical compensation. Previous to this invention both modulator crystals 11 and 12 were maintained at an equal uniform temperature inside the boron nitride over core 13. It was found that by intentionally unbalancing the heaters a precise temperature differential could be created within the oven. This temperature differential causes a change in the birefringence of one crystal with respect to the other and thus produces a net birefringence change which is a function of the magnitude of the differential. By adjusting the temperature differential optical compensation can be obtained for a zero field condition as the nominal operating point about which the automatic electronic compensator functions.

Figure 2:
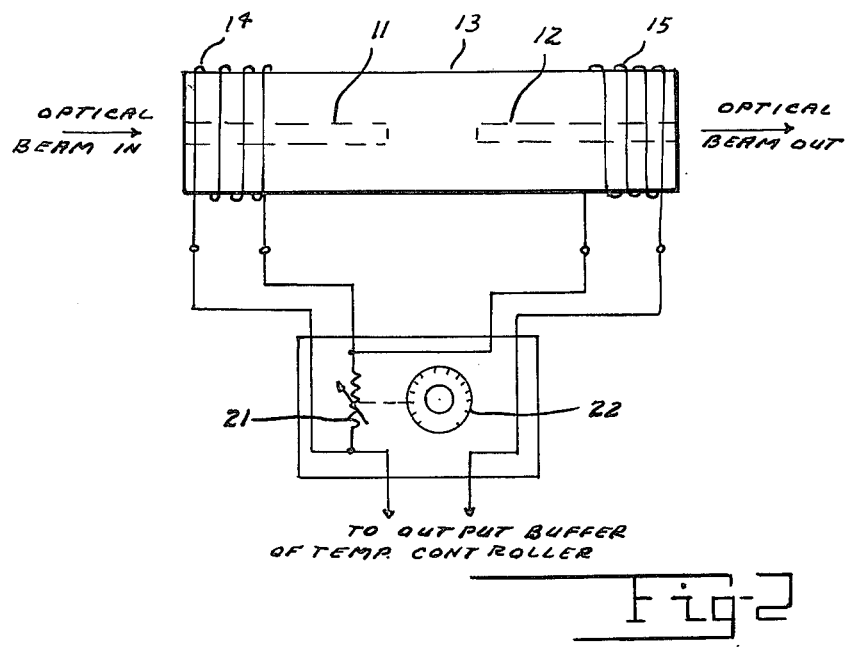
FIG. 2 is a schematic diagram of an embodiment of the invention for providing a thermal differential temperature to the crystal modulator.

In FIG. 2 one embodiment of controlling the differential temperature between the two heater elements is shown. In this embodiment a variable resistance 21 is connected in parallel with one of the two serially connected over heaters. In the drawing it is shown in parallel with the heater element 14. By manually adjusting the resistance value by turning adjusting knob 22 more or less current is shorted around the oven heater element 14 causing that end of the oven to be slightly cooler than the other end, and thus creating the thermal differential providing the compensation. It is to be observed that the total heat supplied to the oven core is still regulated and controlled by the conventional temperature controller 37 as shown in FIG. 3. In some instances it may be desirable that the other end of the modulator crystal be the end that is slightly cooled. In which case the parallel shunting resistance 21 is placed across (electrically) the heater element 15 instead of the element 14. This is generally not critical and may readily be determined for any particular embodiment concerned.

Figure 4:
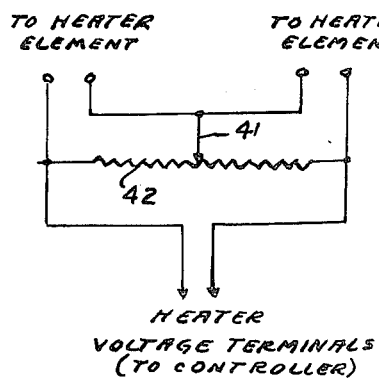
FIG. 4 is a schematic diagram showing another system for providing the control of heater currents to a laser modulator.

FIG. 4 shows schematically another means of electrically distributing the heater current between the two heater elements to provide the required thermal differential. In this embodiment with the slider arm 41 of the potentiometer 42 at the mid position equal heating currents go to the two heater elements, and as the arm is moved off center more heat is obtained from one heater element and less from the other providing the thermal differential. In this embodiment either element may be raised above the other thermally depending on the direction the slider is moved from its mid position. This embodiment, while providing ease of control over which direction the modulator crystals are thermally biased, generally has the disadvantage of being somewhat wasteful of electrical energy in the shunting resistance 42 and thus it usually requires a more powerful temperature controller.

Figure 5:
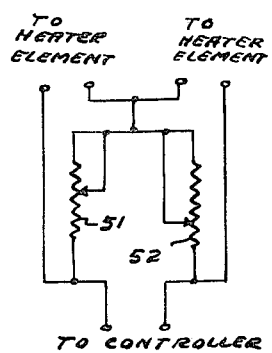
FIG. 5 is a schematic diagram showing still another system for providing control of heater current to a laser modulator.
Figure 2:
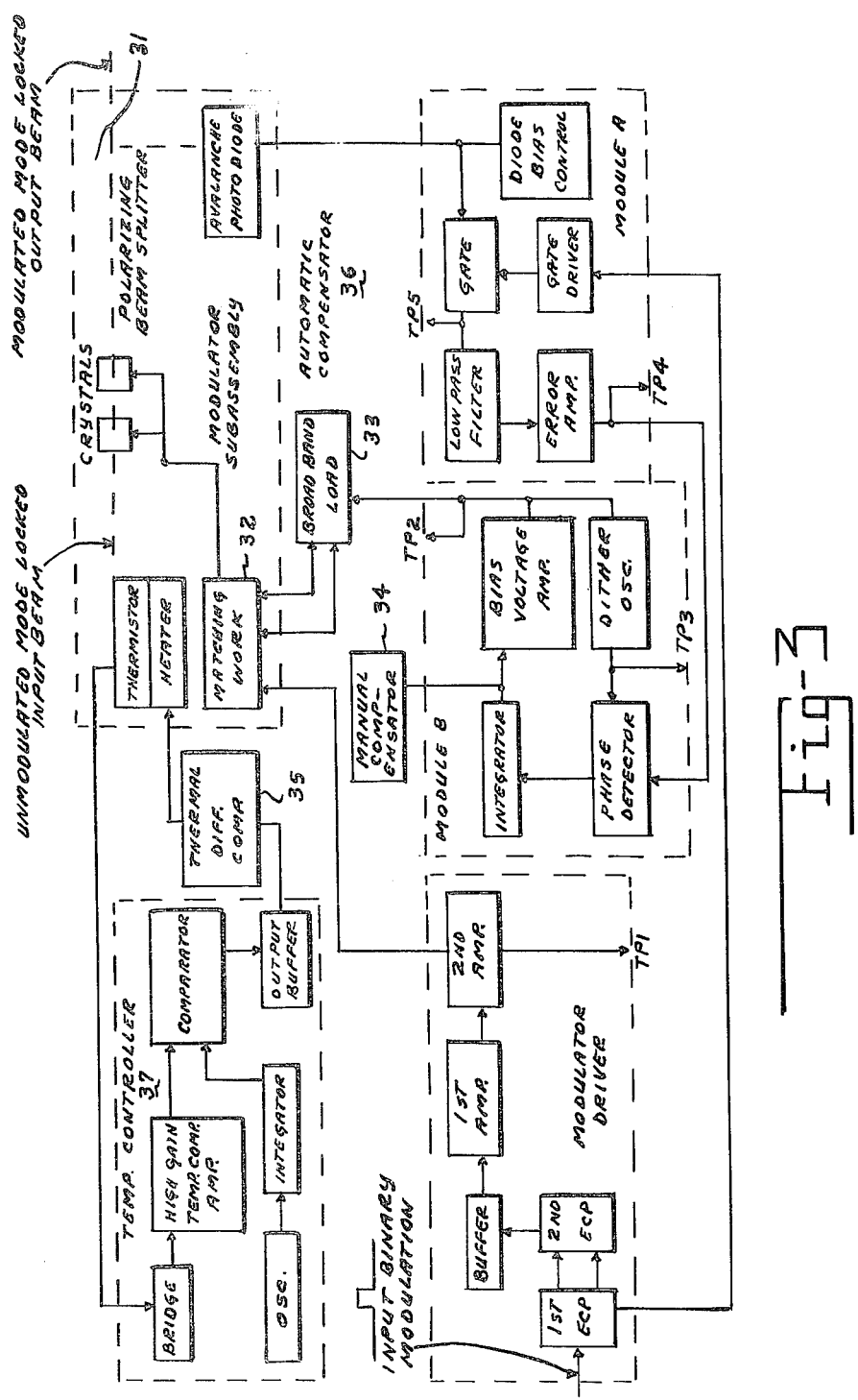

The embodiment shown in FIG. 5 provides a shunting variable resistance across each heater element. In it the temperature of either element may be lowered with respect to the other element by adjustment of the two variable resistances 51 and 52.

Those practicing this invention will readily modify the current controlling means within the scope of the invention to provide the currents to the heater elements which will establish the necessary thermal differential for the crystals taking into consideration the characteristics of the particular temperature controller utilized and the characteristics of the heater elements on the oven core containing the modulation crystals. Also solid state devices may readily be substituted for the variable resistors in the current controlling circuits, and in addition the control may readily be automated instead of manually controlled, if warranted, for a particular application.

In a particular operating embodiment of the invention the oven core temperature was maintained at approximately a nominal temperature of 150°C and a differential temperature control range of a fraction degree provided the range of control necessary to optimize the operation. For this particular operating embodiment temperature differences over three-tenths of a degree cause serious decreases in operating efficiency, with two to three hundredths of a degree being typical values for optimum operation.

The conventional oven cores for crystal laser modulators have two heater elements one element distributed over one end of the core substantially controlling the temperature of the one crystal and another similar element over the other end of the core substantially controlling the temperature of the other crystal. Obviously, this is a requirement for this invention.

We claim:

1. In a laser modulator having two modulation crystals contained in an oven core having two heater elements, one element substantially controlling the temperature of one crystal element of the modulator and the other heater element substantially controlling the temperature of the other crystal element of the modulator, the improvement for providing a determined thermal differential between the two crystal elements, comprising:
   a. controlled source of electrical energy for energizing the said heater elements to provide a determined amount of heat energy to the said oven core; and
   b. means cooperating with the said source of electrical energy and the said heater elements for providing a variable controlled thermal difference in temperature between the said two crystal modulating elements.

2. The improvement in a laser modulation system having a crystal modulator element with two crystal elements contained in an oven core, the said core having a first electrical heating element primarily associated with controlling the temperature of one of the said crystal modulation elements and a second electrical heating element primarily associated with controlling the temperature of the other of the said crystal modulation elements, each of the said heating elements having associated therewith two electrical terminal connections, and the said laser modulation system having a controlled source of electrical energy for energizing the said heating elements, the said source of electrical energy being electrically connected across the serially connected heater elements, the said improvement comprising a manually controllable variable resistance connected in parallel across one of the said heating elements for slightly lowering the electrical energy going into the said heating element and providing a controlled thermal differential between the two said crystal elements whereby the birefringence of the said crystals may be adjusted to provide substantially a zero field optical operating point for the said crystal modulator element.

* * * * *